US010067547B2

(12) United States Patent
Castro-Leon (10) Patent No.: US 10,067,547 B2
(45) Date of Patent: Sep. 4, 2018

(54) POWER MANAGEMENT CONTROL OF REMOTE SERVERS

(71) Applicant: Intel Corporation, Santa Clara, CA (US)

(72) Inventor: Enrique G. Castro-Leon, Damascus, OR (US)

(73) Assignee: Intel Corporation, Santa Clara, CA (US)

( * ) Notice: Subject to any disclaimer, the term of this patent is extended or adjusted under 35 U.S.C. 154(b) by 172 days.

(21) Appl. No.: 14/757,865

(22) Filed: Dec. 24, 2015

(65) Prior Publication Data

US 2016/0202744 A1 Jul. 14, 2016

Related U.S. Application Data

(63) Continuation-in-part of application No. 13/536,916, filed on Jun. 28, 2012, now Pat. No. 9,454,199.

(51) Int. Cl.
*G06F 1/26* (2006.01)
*G06F 1/32* (2006.01)
(Continued)

(52) U.S. Cl.
CPC .............. *G06F 1/266* (2013.01); *G06F 1/329* (2013.01); *G06F 1/3287* (2013.01);
(Continued)

(58) Field of Classification Search
CPC ...................................... G06F 1/26; G06F 1/32
See application file for complete search history.

(56) References Cited

U.S. PATENT DOCUMENTS 5,761,507 A * 6/1998 Govett .................. G06F 9/5027
709/203
6,324,580 B1 * 11/2001 Jindal .................... G06F 9/505
709/228
(Continued)

FOREIGN PATENT DOCUMENTS

| KR | 10-2012-003868 A | 4/2012 |
| KR | 20120038688 A | 4/2012 |
| WO | WO2014/159977 A | 10/2012 |

OTHER PUBLICATIONS

Non-Final Office Action dated Jul. 23, 2014 for U.S. Appl. No. 13/536,916, 19 pages.
(Continued)

*Primary Examiner* — Phil Nguyen
(74) *Attorney, Agent, or Firm* — Schwabe, Williamson & Wyatt, P.C.

(57) ABSTRACT

Servers, storage medium and methods associated with control of power management services of remote servers of a remote computing service are disclosed herein. In embodiments, an apparatus to control power consumption of computer hardware may comprise a datacenter management control module to receive a request to increase capacity of a server pool from a computing device; determine an available server with available capacity that includes a power management controller to collect power consumption data for one or more of a power supply, a memory, or a processor of the available server, wherein the available server may be a remote cloud server in a different subnet than the server pool and the computing device; add or facilitate addition of the available server to the server pool; and transmit power management commands to the server added to the server pool to at least partially control power consumption of the server provided with the power management commands. Other embodiments may be disclosed or claimed.

25 Claims, 5 Drawing Sheets

(51) Int. Cl.
*H04L 29/08* (2006.01)
*G06F 9/50* (2006.01)

(52) U.S. Cl.
CPC ........ *G06F 9/5094* (2013.01); *H04L 67/1097* (2013.01); *Y02D 10/171* (2018.01); *Y02D 10/22* (2018.01); *Y02D 10/24* (2018.01)

(56) References Cited

U.S. PATENT DOCUMENTS

| | | | | |
|---|---|---|---|---|
| 6,795,928 | B2* | 9/2004 | Bradley | ............... G06F 1/206 713/320 |
| 6,816,905 | B1* | 11/2004 | Sheets | ............... G06F 9/5061 709/226 |
| 8,032,776 | B2 | 10/2011 | Merkin | |
| 8,127,093 | B2* | 2/2012 | Asano | ............... G06F 3/0605 711/161 |
| 9,454,199 | B2 | 9/2016 | Castro-Leon et al. | |
| 2003/0056126 | A1* | 3/2003 | O'Connor | ............... G06F 1/263 713/300 |
| 2004/0054780 | A1 | 3/2004 | Romero | |
| 2004/0088541 | A1 | 5/2004 | Messerges et al. | |
| 2004/0103312 | A1 | 5/2004 | Messerges et al. | |
| 2005/0188075 | A1* | 8/2005 | Dias | ............... H04L 67/1008 709/224 |
| 2005/0198245 | A1 | 9/2005 | Burgess et al. | |
| 2006/0265353 | A1 | 11/2006 | Garg et al. | |
| 2007/0049133 | A1* | 3/2007 | Conroy | ............... G06F 1/26 439/894 |
| 2007/0050644 | A1 | 3/2007 | Merkin | |
| 2007/0130341 | A1* | 6/2007 | Ma | ............... G06F 1/26 709/226 |
| 2007/0130481 | A1 | 6/2007 | Takahashi et al. | |
| 2007/0271475 | A1 | 11/2007 | Hatasaki et al. | |
| 2008/0162956 | A1 | 7/2008 | Bozek et al. | |
| 2008/0178018 | A1 | 7/2008 | McGrane et al. | |
| 2009/0031153 | A1 | 1/2009 | Bahali et al. | |
| 2009/0077394 | A1 | 3/2009 | Tsai et al. | |
| 2009/0106571 | A1 | 4/2009 | Low et al. | |
| 2009/0138734 | A1 | 5/2009 | Uchida | |
| 2009/0184161 | A1 | 7/2009 | Ueno et al. | |
| 2009/0187775 | A1 | 7/2009 | Ishikawa | |
| 2009/0195349 | A1 | 8/2009 | Frader-Thompson et al. | |
| 2009/0222679 | A1 | 9/2009 | Lee | |
| 2009/0235097 | A1* | 9/2009 | Hamilton | ............... G06F 1/3203 713/320 |
| 2009/0254660 | A1 | 10/2009 | Hanson et al. | |
| 2010/0162013 | A1 | 6/2010 | Oh et al. | |
| 2010/0218005 | A1* | 8/2010 | Jain | ............... G06F 9/5094 713/300 |
| 2011/0029970 | A1* | 2/2011 | Arasaratnam | ....... G06F 9/45558 718/1 |
| 2011/0072293 | A1 | 3/2011 | Mazzafem et al. | |
| 2012/0080949 | A1 | 4/2012 | Gelonese | |
| 2012/0117399 | A1* | 5/2012 | Chan | ............... G06F 9/5094 713/320 |
| 2012/0151353 | A1* | 6/2012 | Joanny | ............... H04L 29/0899 715/735 |
| 2014/0006815 | A1 | 1/2014 | Castro-Leon et al. | |

OTHER PUBLICATIONS

Final Office Action dated Feb. 13, 2015 for U.S. Appl. No. 13/536,916, 17 pages.
Non-Final Office Action dated Dec. 22, 2015 for U.S. Appl. No. 13/536,916, 25 pages.
Notice of Allowance dated Jun. 8, 2016 for U.S. Appl. No. 13/536,916, 18 pages.
Office Action dated Jan. 24, 2017 for Chinese Patent Application No. 201380028137.1, 21 pages.
International Search Report and Written Opinion dated Mar. 13, 2017 for International Application No. PCT/US2016/063377, 13 pages.
International Search Report and Written Opinion dated Dec. 17, 2013 for International Application No. PCT/US2013/043915, 18 pages.
International Preliminary Report on Patentability for PCT Application No. PCT/US2013/043915, dated Jan. 8, 2015, 13 pages.
Office Action dated Aug. 4, 2017 for Chinese Patent Application No. 201380028137.1, 29 pages.

* cited by examiner

POWER MANAGEMENT CONTROL OF REMOTE SERVERS

RELATED APPLICATION

This application is a continuation-in-part application of, and claims priority to U.S. patent application Ser. No. 13/536,916, entitled "Power Management Control of Remote Servers," filed on Jun. 28, 2012, which Specification is hereby fully incorporated by reference.

TECHNICAL FIELD

This application relates to the technical field of data processing, more specifically to methods and apparatuses associated with remote control of power management of remote computing servers.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Large information technology (IT) applications may encompass hundreds of servers in data centers with an annual electricity bill in the order of hundreds of thousands of dollars. Because it is difficult to know server power consumption in advance, servers at data centers are usually deployed with an over-commitment of power, and customers of the data centers often pay the power bill of the over-commitment. The Uptime Institute calculates that the starting data center capital cost for each installed kilowatt is about $10 thousand dollars, and without special measures, that's just enough to power two servers.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION

Servers, storage medium and methods associated with control of power management services of remote servers of a remote computing service are disclosed herein. In embodiments, an apparatus to control power consumption of computer hardware may comprise a datacenter management control module to receive a request to increase capacity of a server pool having one or more computer servers from a computing device; determine an available server with available capacity to meet or contribute to meeting the requested capacity, and includes a power management controller to collect power consumption data for one or more of a power supply, a memory, or a processor of the available server, wherein the available server may be a remote cloud server in a different subnet than the computer servers of the server pool and the computing device; add or facilitate addition of the available server to the server pool; and transmit power management commands to the server added to the server pool to at least partially control power consumption of the server provided with the power management commands.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)".

Figure 1:
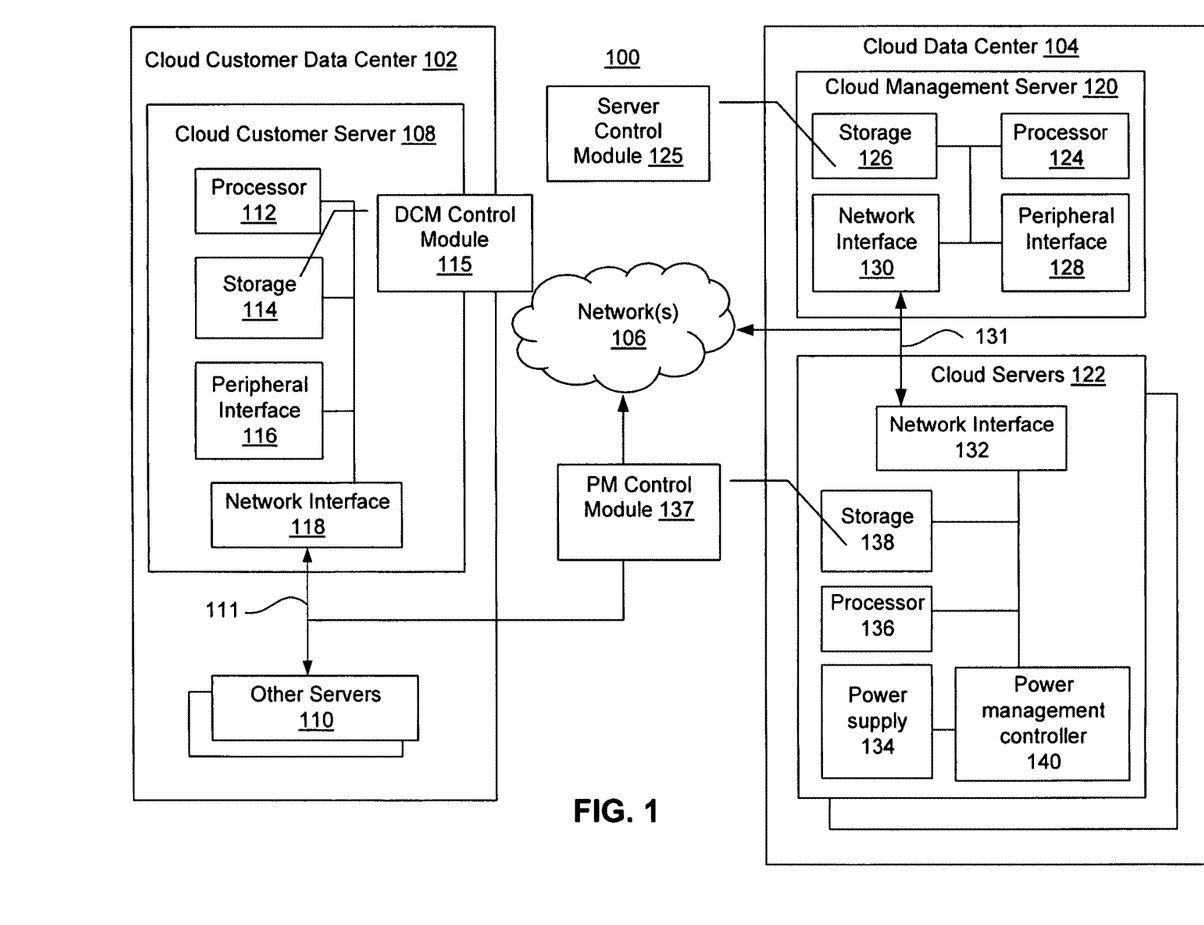
FIG. 1 illustrates an arrangement configured to enable a remote server, that is a customer of a remote computing service, to power manage remote servers that may provide the remote computing service.

FIG. 1 illustrates an arrangement 100 configured to enable a customer of a remote computing service to extend power management policies of the customer directly to servers that may be providing the remote computing service, i.e., across remote computing service boundaries, in accordance with various embodiments. Remote computing, with accompanying support servers, often referred to by those skilled in the art as cloud computing, cloud servers, and/or variants of the like. Thus, for readability, concept of remote computing and other variants, may be referred to as cloud computing, cloud servers, and/or the like in the description to follow. These terms are meant to be synonymous, unless the context clearly indicates otherwise. As shown, arrangement 100 may include a cloud customer data center 102 and a cloud data center 104 coupled with each other via network(s) 106.

Cloud customer data center 102 may be a recipient of cloud services, such as a company who subscribes to cloud services from a cloud services provider. Cloud customer data center 102 may include a cloud customer server 108 that may be a local server configured to manage various requests for data and/or other services from clients or network users. Cloud customer server 108 may be a server configured to manage other servers 110 organized as one or more server pools, to provide one or more applications to users of cloud customer data center 102. Cloud customer server 108, in combination with other servers 110, may collect, store, and provide data and/or data services, upon request, to users of cloud customer data center 102. Cloud customer server 108 may be configured with data center management (DCM) control module 115 to define, determine, and implement one or more power management policies on other servers 110 forming the one or more server pools. For example DCM control module 115 may be configured to monitor the working capacity of each of other servers 110 of the one or more server pools and, in response to receiving feedback regarding the capacity of other servers 110, DCM control module 115 may provide commands to other servers 110 to at least partially control power consumption of one or more other servers 110, e.g., to cause one or more other servers 110 to enter a partial or full low-power mode, to power down, to fully or partially hibernate, or the like. In embodiments, DCM control module 115 may also be configured to contact cloud management server 120 of cloud data center 104, query cloud management server 120 e.g., a database of cloud management server 120, regarding availability of cloud servers 122, including their capacity and power management capability, to be added to the one or more server pools in whole or in part (via virtual machines operating on the cloud servers 122) to join other servers 110 in servicing users of cloud customer data center 102. In response to the reply received on availability of cloud servers 122, including their capacity and power management capability, e.g., in the form of metadata, DCM control module 115 may selectively add one or more cloud servers 122 in whole or in part to the one or more server pools to join other servers 110 in servicing users of cloud customer data center 102 (operating user applications). According to embodiments, cloud customer server 108 and other servers 110 may share a subnetwork (subnet) and may be connected via a network connection 111.

Cloud customer server 108 may include a processor 112, storage 114, peripheral interface 116, and a network interface 118. DCM control module 115 may be located in storage 114 and operated by processor 112.

Processor 112 may be any one of a number of single or multi-core processors known in the art, e.g., those available from Intel® Corporation of Santa Clara, Calif.

Storage 114 may be volatile memory, non-volatile memory, or include both volatile and non-volatile memory. For example, storage 114 may include random access memory (RAM), flash memory, optical disk memory, magnetic field based memory, hard disk drives, or the like. As discussed above, storage 114 may be configured to store a plurality of instructions which, in response to execution by processor 112, may enable cloud customer server 108 to detect, determine, request, and/or adjust one or more power management policies.

Peripheral interface 116 may include, but is not limited to, universal serial bus (USB) ports, PS/2 ports, interfaces to interact with display devices, wireless devices, and or other types of potential user and/or electronics interfaces.

Network interface 118 may be configured to selectively connect cloud customer server 108 to other servers 110 and to network(s) 106. Network interface 118 may include, but is not limited to, a wireless local area network interface. An example of a wireless local area network interface may be a WiFi® interface in compliance with one of the IEEE 802.11 standards. (IEEE=Institute of Electrical and Electronic Engineers.) In alternate embodiments, network interface 118 may include a wireless personal network interface. An example of a wireless personal network interface may be a Bluetooth® interface. In still other embodiments, network interface 118 may include a wireless wide area network. An example of a wireless wide area network interface may be a 3G or 4G telecommunication interface. (3G and 4G refer to the $3^{rd}$ and $4^{th}$ Generation of Mobile Telecommunication Standards as defined by International Telecommunication Union.)

Other servers 110 may be any one of a number of servers known in the art. In particular, one or more of other servers 110 may support the Intelligent Platform Management Interface (IPMI) to facilitate management communication with cloud customer server 108, in particular, DCM control module 115. IPMI defines a set of interfaces DCM control module 115 to perform out-of-band management of servers 110, and monitor their operations. In some embodiments, one or more of other servers 110 may support the Redfish Application Programming Interface (API) defined by Distributed Management Task Force (DMTF). Redfish API is a RESTful API for the management of scale-out commodity servers, as well as older platforms. The Redfish API deals with resources which are expressed based on Open Data Protocol (OData) or JavaScript Object Notation schema, with one or more representational state transfer constraints. Resources may be accessed through the use of Hypertext Transfer Protocol (HTTP) operations: GET, PUT, POST, etc., or a set of Actions that go beyond what create, read, update and delete (CRUD) HTTP operations can perform. An example of such an action is performing a system reset. API clients can use the schema to discover the semantics of the resource properties. The Redfish API specification provides for three main category of objects:

Systems—server, central processing unit (CPU), memory, devices, etc.

Managers—Baseboard Management Controller (BMC), Enclosure Manager, and so forth.

Chassis—racks, enclosures, blades, etc.

In embodiments, DCM control module 115 may be configured to communicate via IPMI or Redfish API with other servers 110.

Still referring to FIG. 1, cloud data center 104 may be a data center arranged to store and/or operate a plurality of servers configured to provide cloud services to customers, such as to cloud customer data center 102. Cloud data center 104 may include cloud management server 120, cloud servers 122, and a variety of facility services to provide power, heating, and cooling services to the cloud management server 120 and cloud servers 122. In a typical cloud data center 104 arrangement, a customer of the services provided by cloud data center 104 may be charged for services based in part on the amount of power consumed by each cloud server 122, based on the amount of power used to climate control cloud data center 104, as well as based on the number of cloud servers 122 for which technical support is provided through the cloud data center 104. Cloud data centers may, for various security reasons, block customers and/or other users from accessing certain types of information from cloud servers 122 and may block computer systems that are remote to cloud data center 104 from manipulating cloud servers 122. As a result, cloud data center 104 may operate cloud servers 122 so that cloud servers 122 provide as much bandwidth as cloud servers 122 may provide, without concerns for energy efficient usage or operation of cloud servers 122. Thus, clients of services provided by cloud data center 104 may be paying for energy costs that may be may be decreased by selective modification to the power policies of cloud servers 122.

Cloud management server 120 may be configured with server control module 125 to query cloud servers 122 to determine whether each of cloud servers 122 provide or may provide power management services. With reference to cloud customer server 108, cloud management server 120 may be a remote server configured to provide support for or to provide one or more remote computing services, e.g., cloud services. Server control module 125 may be configured to query each of cloud servers 122 and compile a list or a record based on the responses from cloud servers 122. The record created by server control module 125 may include a variety of data. For example, the record may include a list of ones of the cloud servers 122 enabled to provide power management services or capabilities. The record may also include handle identifiers, such as Internet protocol (IP) addresses, and may provide application programming interface (API) calls which may be used to manipulate power management policies of those of cloud servers 122 that are enabled to provide power management services. Service metadata may be information about the capabilities of a service. The record may provide information about the power management services of the cloud servers 122 and may therefore be a service metadata record, or a metadata record.

Cloud management server 120 may include a processor or processor core(s) 124, storage 126, peripheral interface 128, and/or network interface 130. Server control module 125 may be located in storage 126 and operated by processor or processor core(s) 124.

Processor 124 may be configured to operate server control module 125 to retrieve information from cloud servers 122 and compile/create a record based on the retrieved information by executing one or more instructions stored on storage 126. Similar to processor 112, processor 124 may be any one of a number of single or multi-core processors.

Storage 126 may be volatile memory, non-volatile memory, and/or a combination of volatile memory and non-volatile memory. Storage 126 may store a plurality of instructions which, when executed, may cause processor 124 to gather information from cloud servers 122 and communicate the gathered information to cloud customer server 108 through network(s) 106. The instructions will be discussed further in connection with FIG. 2, according to various embodiments.

Peripheral interface 128 may enable a variety of user interfaces, such as mice, keyboards, monitors, and/or audio commands. For example, peripheral interface 128 may enable USB ports, PS/2 ports, Firewire® ports, Bluetooth®, and a like, according to various embodiments.

Network interface 130 may be coupled to cloud servers 122 and to network(s) 106 through a network connection 131. Network interface 130 may be a wireless local area network interface, such as a WiFi® interface in compliance with one of the IEEE 802.11 standards. In alternate embodiments, network interface 130 may include, but is not limited to, a wireless personal network interface, such as a Bluetooth® interface. Network interface 130 may include a wireless wide area network interface, such as 3G or 4G telecommunication interface.

Similar to other servers 110, cloud management server 120 may be configured to support either IPMI or Redfish API for communication with cloud customer server 108, DCM control module 115 in particular.

Cloud servers 122 may be configured to provide a variety of cloud-based services. According to embodiments, from the perspective of cloud customer server 108, cloud servers 122 may be one or more remote servers configured to be added to one or more of the server pools formed with other servers 110 to support or provide one or more remote computing services, e.g., cloud-based services, to users of cloud customer data center 102 (their applications). Cloud servers 122 may provide cloud-based services to users outside of cloud data center 104 based on instructions, commands, and or security policies received from cloud management server. 120, according to embodiments of the disclosure. According to embodiments, cloud servers 122 may represent servers associated with a broad range of search engine, social networking and/or e-commerce websites. Example of such websites may include, but are not limited to, Google®, Facebook®, and Amazon®. While cloud customer data center 102 may be the headquarters or the owner of the cloud-based websites, actual operation of servers that host the websites may have been outsourced to an owner and/or operator of cloud data center 104. According to various embodiments, cloud servers 122 may be configured with power management (PM) control module 137 to receive power management commands from cloud customer server 108 to reduce overall power consumption of cloud servers 122 in order to reduce operating costs. In embodiments, cloud servers 122 may be shared, providing cloud services to a plurality of cloud customer data centers 102. That is, the cloud services may be provided through applications operating on virtual machines operating on cloud servers 122. In embodiments, each of one or more cloud servers 122 may be entirely dedicated to the provision of cloud services to a single cloud customer data center 102, e.g., being added to a server pool that includes all or a subset of the servers 110.

Cloud servers 122 may include a network interface 132. Network interface 132 may be similar to network interface 130 and network interface 118. Network interface 132 may enable cloud servers 122 to receive instructions and/or commands from cloud management server 120 and may enable cloud servers 122, in particular, PM control module 137, to provide power management-based information or capabilities to cloud management server 120. Network interface 132 may also enable cloud servers 122 to respond to queries and or commands received from cloud customer server 108. Cloud servers 122 may also include storage 138, processor 136, power supply 134, and a power management controller 140.

Power management controller 140 may be configured to monitor power consumption of one or more of storage 138, processor 136, and/or power supply 134. Power management controller 140 may determine power consumption based on voltage sensors, current sensors, temperature sensors, and/or other sensors of the like, located proximate to each of storage 138, processor 136, and/or power supply 134. Power management controller 140 may be configured to be responsive to instructions received from PM control module 137, responding to instructions received through network interface 132. For example, power management controller 140 in cooperation with PM control module 137 may provide network interface 132 with data that may be indicative of power management services available through power management controller 140 (for transmission to DCM control module 115). According to other embodiments, power management controller 140 may be enabled to cause one or more of cloud servers 122 to enter a low-power mode, to hibernate, and/or to power down. According to embodiments, even while cloud server 122 is powered down, external computing devices such as cloud management server 120 and/or cloud customer server 108 may be enabled to access power management controller 140 through network interface 132.

Storage 138 may include, but is not limited to, non-volatile memory and/or volatile memory. Storage 138 may include a variety of instructions which, when executed by processor 136, may cause and/or enable processor 136 to provide cloud services to one or more users of network(s) 106.

Power supply 134 may provide power to each of the variety of components included in each of cloud servers 122.

Network(s) 106 are intended to represent a broad range of wired or wireless, local or wide area networks, private or public, including e.g., the Internet.

Similar to other servers 110, cloud servers 122 may be configured to support either IPMI or Redfish API for communication with cloud customer server 108, DCM control module 115 in particular.

Figure 2:
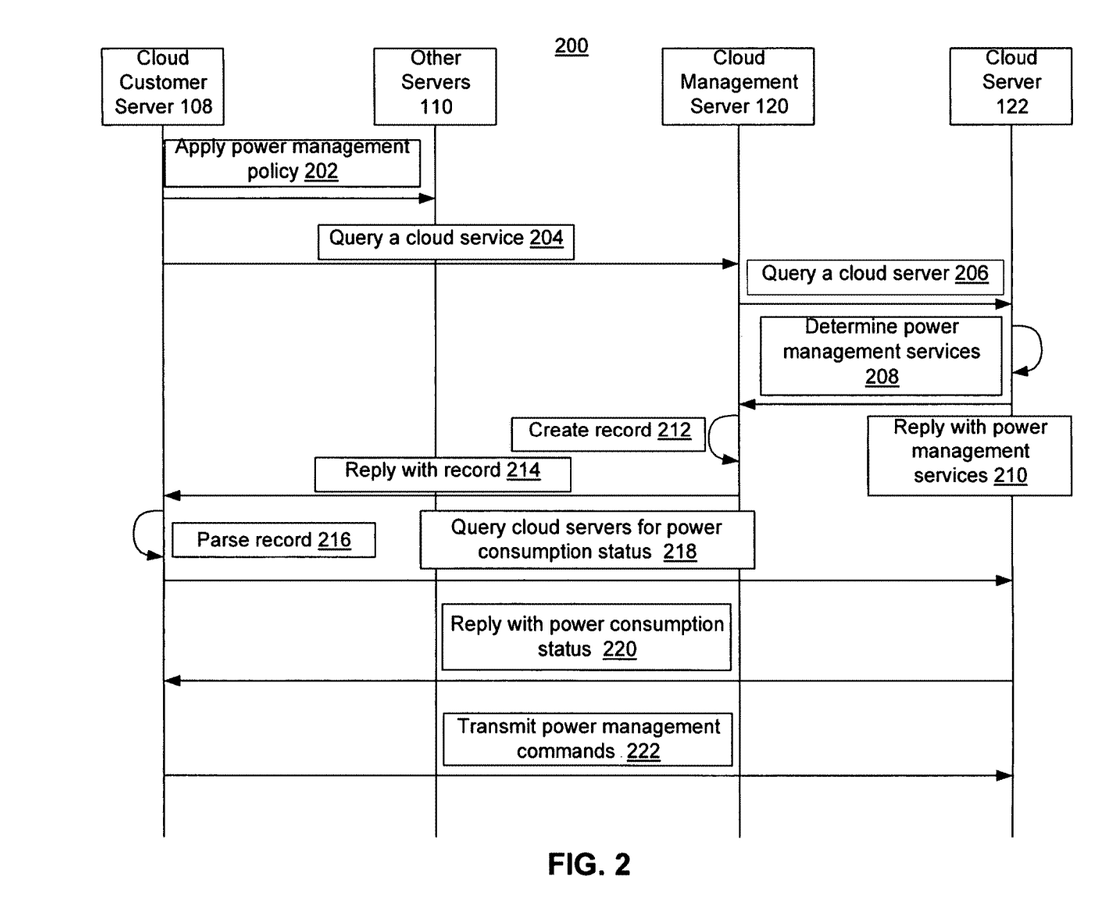
FIG. 2 illustrates a method of the arrangement of FIG. 1.

FIG. 2 illustrates a method of the arrangement of FIG. 1, in accordance with various embodiments. As shown, method 200 may begin at block 202. At block 202 cloud customer server 108, e.g., DCM control module 115, may apply a power management policy to a number of other servers 110 that may be operated in the same data center as customer server 108. By applying a power management policy to servers 110, cloud customer server 108 may provide cost savings to the data center by increasing loads on some of servers 110 in order to power down others of servers 110 for a net power savings. At block 204, cloud customer server 108, e.g., DCM control module 115, may perform discovery on a cloud service provider by querying cloud management server 120, e.g., via IPMI or Redfish API, for availability of cloud servers 122 and a record of their power management services. At block 206, cloud management server 120 may query cloud servers 122 to determine which, if any, of cloud servers 122 may be available and/or enabled to provide power management services. For example, cloud management server 120 may query each of cloud servers 122 to determine which, if any, has available capacity and whether the server includes a power management controller. At block 208, each of cloud servers 122 may execute a diagnostic check or run a self-query to determine their current capacity to take on additional workload, and which power management services are available. At block 210, each of cloud servers 122 may reply to the query from cloud management server 120 with data or a list indicating their available capacity and which power management services the cloud server 122 may provide.

At block 212, cloud management server 120 may create a record that includes the availability of cloud server 122 and power management services that are available from each of cloud servers 122. Cloud management server 120 may include additional information in the record. For example, cloud management server 120 may include IP addresses associated with each of cloud servers 122. More particularly, the IP addresses may provide access to power management controllers that may be included in the cloud servers 122. Cloud management server 120 may create the record to include other information, such as passwords, other handles to access cloud servers 122, and/or API calls to enable cloud customer server 108 to manipulate power management services of cloud servers 122.

At block 214, cloud management server 120 may provide the record to cloud customer server 108, e.g., in the form meta data, via IPMI or Redfish API, in response to the query of block 204. Cloud management server 120 may encrypt the record prior to transmission to cloud customer server 108, for example, by using public key infrastructure (PKI) certificates. Alternatively or additionally, cloud management server 120 may create a message authentication code (MAC), based on a hash function, to be transmitted with the record to enable cloud customer server 108 to authenticate that the record has not been altered during transmission through network 106.

At block 216, cloud customer server 108 may parse the record to discover which, if any, cloud servers 122 can provide the needed capacity, and power management services are available on cloud servers 122, suitable to host the cloud service that the customer may be subscribed to. From the record, cloud customer server 108 may also determine or retrieve handle identifiers, e.g., IP addresses, of the power management enabled cloud servers 122. Before parsing, cloud customer server 108 may authenticate at least part of the information included in the record.

At block 218, during operation after having added one or more cloud servers 122 to the server pools, cloud customer server 108, e.g., DCM control module 115, may query cloud servers 122, e.g., via IPMI or Redfish API, to determine power consumption status of components, such as processors, memory, and power supplies. Cloud customer server 108 may initiate the query based on handle identifiers, IP addresses, and/or other information included in the record. At block 220, power management controllers and/or processors of cloud servers 122 may reply, via IPMI or Redfish API, to the query with power consumption data or status. Power consumption data may include indication of the load of each of the processors of cloud servers 122 to enable cloud customer server 108 to determine if one or more cloud servers 122 may be powered down without loss of quality of service. At block 222, cloud customer server 108, e.g. DCM control module 115, may transmit power management commands to cloud servers 122 based on the power consumption status(es) received. For example, DCM control module 115 may transmit, e.g., via IPMI or Redfish API, power management commands to cause cloud servers 122 to hibernate, enter standby, enter another low-power mode, power down, or issue power limitation commands. In addition to power management commands, cloud customer server 108 may also reconfigure one or more cloud servers 122 to include cloud servers 122 within the same subnetwork (subnet) as servers 110. By including cloud servers 122 within the same subnet as servers 110, cloud customer server 108 may include the outsourced servers as part of a single trusted pool and may extend the enterprise perimeter to increase the size of the trusted compute base of cloud customer server 108.

Alternatively, at block 218, cloud customer server 108, e.g., DCM control module 115, may be configured to query, e.g., via IPMI or Redfish API, cloud management server 120, and cloud management server 120 may directly query cloud servers 122. Additionally, at block 222 cloud customer server 108 may transmit, e.g., via IPMI or Redfish API, power management commands to cloud servers 122 through cloud management server 120. According to various embodiments, cloud servers 122 may be configured to reply directly to cloud customer server 108 via IPMI or Redfish API, and through network(s) 106, or cloud servers 122 may be configured to reply to cloud customer server 108 through cloud management server 120.

Upon receipt of the record from cloud management server 120, cloud customer server 108 may be enabled to further manipulate cloud servers 122. For example, by using information from the record, cloud customer server 108 may transplant or install code onto cloud servers 122. According to various embodiments, the code may enable cloud customer server 108, cloud management server 120, and/or other computing devices to determine which power management services are available from cloud servers 122. Similar to transmission of the record, transplanted or installed code may be encrypted or be subject to an attestation scheme to ensure that the code has not been tampered with in transit.

According to various embodiments, cloud customer server 108 may receive power management policies from an administrative management computing device that is remote to both cloud customer data center 102 and cloud data center 104.

While cloud servers 122 may provide power management service information at lower levels of the open systems interconnect (OSI) stack, e.g., network or physical layers, to enable searchability of the service, various programs of cloud servers 122 may suppress or hide the availability of power management services for security purposes, according to various embodiments.

Figure 3:
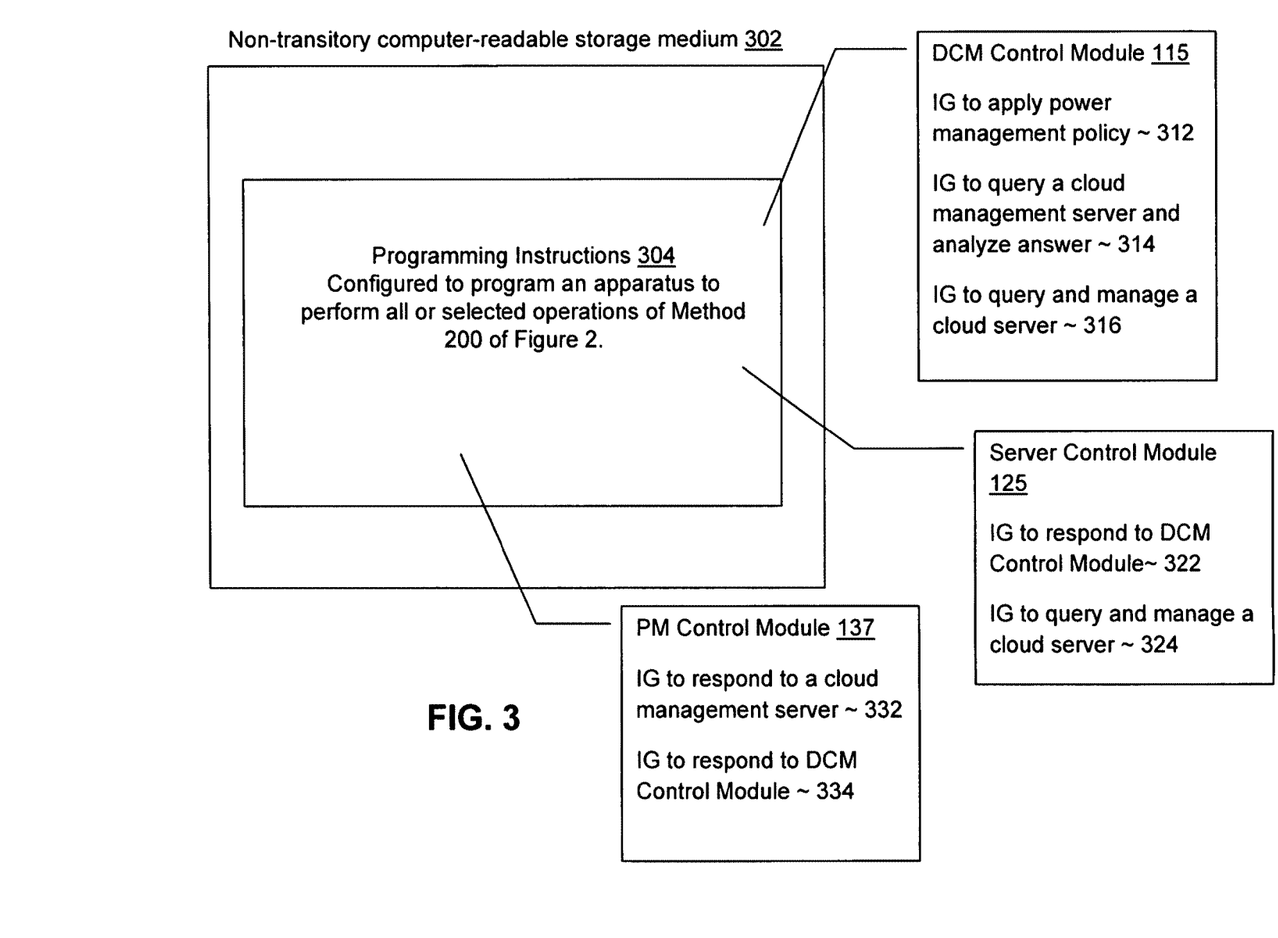
FIG. 3 illustrates an example computer-readable storage medium having instructions configured to practice all or selected aspects of the method of FIG. 2.

FIG. 3 illustrates an example computer-readable storage medium having instructions configured to practice all or selected aspects of the method of FIG. 2, in accordance with various embodiments of the present disclosure. As illustrated, computer-readable storage medium 302 may include a number of programming instructions 304. Programming instructions 304 may be configured to enable a computing device to perform the cloud customer server operations, such as the DCM control module operations, the cloud management server operations, such as server control module operations, or the cloud server operations, such as PM control module operations of method 200 earlier described with references to FIG. 2.

In embodiments, programming instructions 304 may include instructions to implement the DCM control module 115. The structure of the DCM control module 115 may include a group of instructions (IG) 312, in response to execution, to apply power management policy, a group of instructions (IG) 314, in response to execution, to query a cloud management server and analyze the answer provided, and a group of instructions (IG) 316, in response to execution, to query and manage a cloud server. Programming instructions 304 may further include instructions to implement the server control module 125. The structure of the server control module 125 may include a group of instructions (IG) 322, in response to execution, to respond to the DCM control module 115, and a group of instructions (IG) 324, in response to execution, to query and manage a cloud server. Programming instructions 304 may also include instructions to implement the PM control module 137. The structure of the server control module 125 may include a group of instructions (IG) 332, in response to execution, to respond to a cloud management server, and a group of instructions (IG) 334, in response to execution, to respond to the DCM control module 115.

In alternate embodiments, programming instructions 304 may be disposed on multiple computer-readable storage media 302 instead. In various embodiments, computer-readable storage medium 302 may be a non-transitory storage medium. In alternate embodiments, computer-readable storage medium 302 may be transitory storage medium, such as signals.

Figure 4:
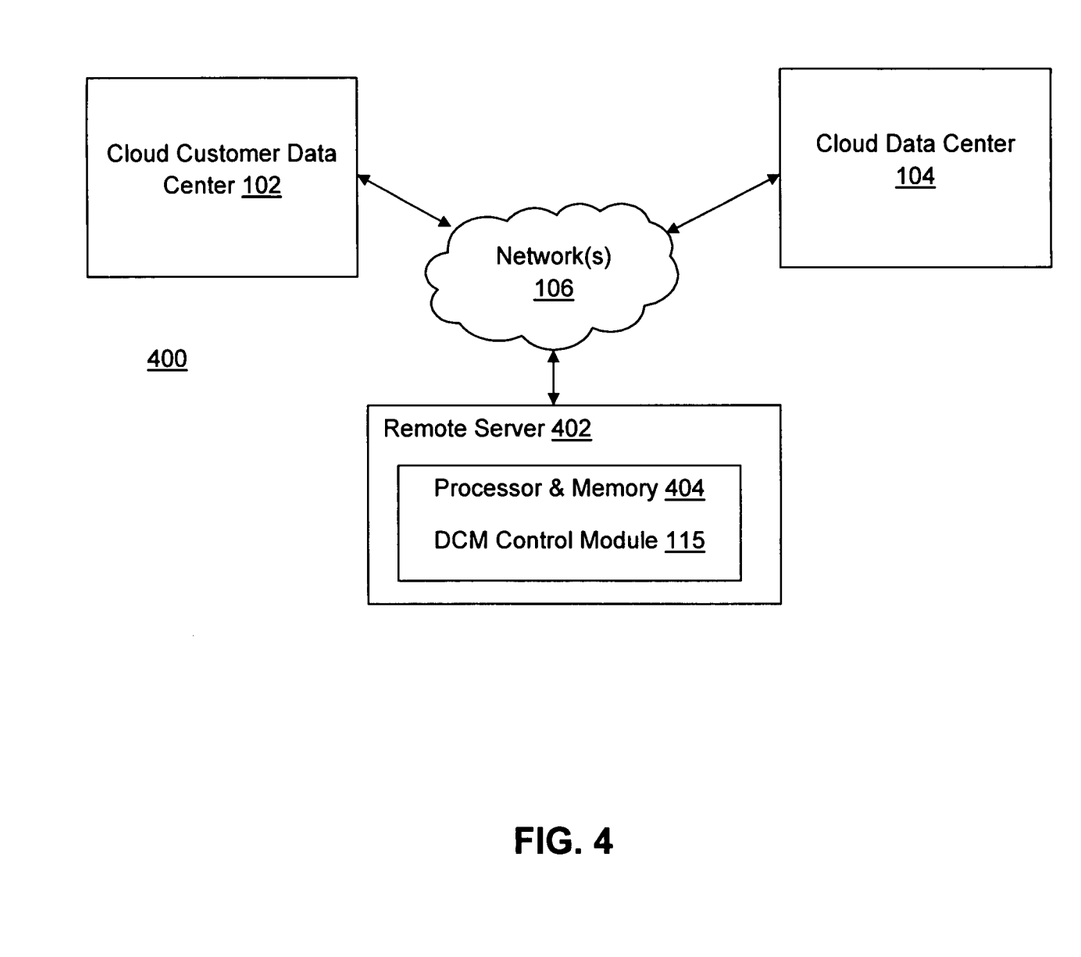
FIG. 4 illustrates an alternate arrangement configured to enable a customer of a remote computing service, to power manage remote servers that may provide the remote computing service.

FIG. 4 illustrates an alternate arrangement configured to enable a customer of a remote computing service, to power manage remote servers that may provide the remote computing service, in accordance with various embodiments of the present disclosure. The arrangement 400 may include cloud customer data center 102, cloud data center 104 and a remote server 402, coupled to each other via one or more networks 106. Cloud customer data center 102, as illustrated and described with reference to FIG. 1, may include cloud customer server 108 and other servers 110 configured and perform operations as earlier described, with the exception of DCM control module 115. Cloud data center 104 may include cloud management server 120 and cloud servers 122 configured and perform operations as earlier described. That is, cloud servers 122 may be added in whole or in part (its virtual machines), by DCM control module 115, to a server pool having servers 110 of cloud customer data center 102. However, unlike arrangement 100, DCM control module 115 may be disposed in processor and memory arrangement 404 of remote server 402 in a subnet that is different from the subnets of cloud customer data center 102 and the cloud data center 104, and provide the earlier described data center management operations, such as adding remote cloud servers in cloud data center 104 to one or more server pools of cloud customer data center 102 from remote server 402. In embodiments, DCM control module 115 may query a database associated with a cloud management server 120 of cloud data center 104 for cloud server available capacity and power management capability information, and transmit power control commands to cloud servers 122 of cloud data center 104, out-of-band, using the Redfish communication protocol.

Figure 5:
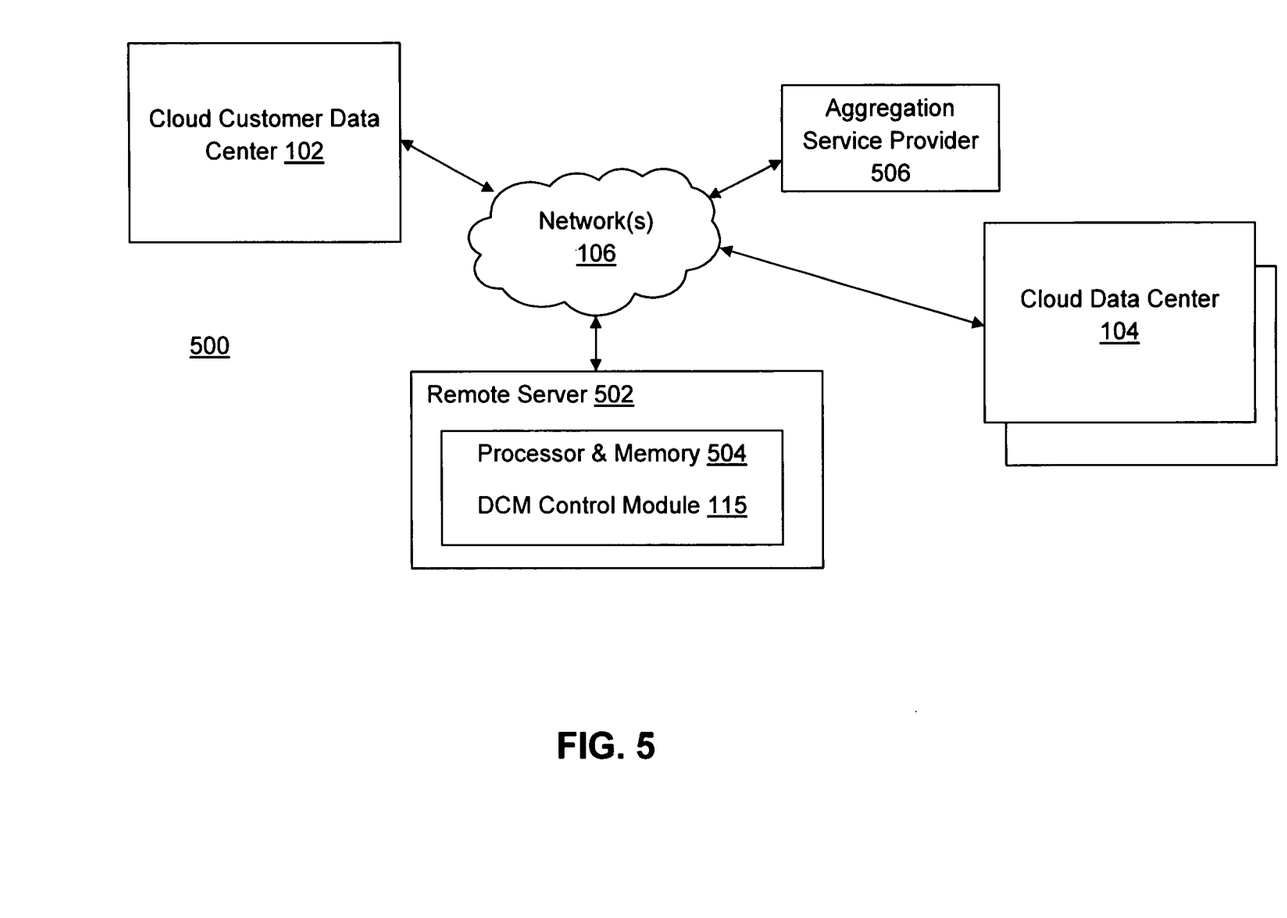
FIG. 5 illustrates still another alternate arrangement configured to enable a customer of a remote computing service, to power manage remote servers that may provide the remote computing service, all arranged in accordance with embodiments of the present disclosure.

FIG. 5 illustrates still another alternate arrangement configured to enable a customer of a remote computing service, to power manage remote servers that may provide the remote computing service, in accordance with various embodiments of the present disclosure. The arrangement 500 may include cloud customer data center 102, a plurality of cloud data centers 104 (e.g., provided by the same or different cloud data center service providers), an aggregation service provider 506, and a remote server 502, coupled to each other via one or more networks 106. Cloud customer data center 102, as illustrated and described with reference to FIG. 1, may include cloud customer server 108 and other servers 110 configured and perform operations as earlier described, with the exception of DCM control module 115. Each of cloud data centers 104 may respectively include cloud management server 120 and cloud servers 122 configured and perform operations as earlier described. That is, cloud servers 122 of different cloud data center 104 may be added in whole or in part (their virtual machines) to a server pool having servers 110. However, unlike arrangements 100 and 400, cloud data centers 104 are abstracted by aggregation service provider 506. That is, aggregation service provider 506 is configured to combine the cloud services provided by cloud data centers 104, as if the combined cloud services are provided by the aggregation service provider 506. Unlike arrangement 100, but similar to arrangement 400, DCM control module 115 may be disposed in processor and memory arrangement 504 of remote server 502 in a subnet that is different from the subnets of cloud customer data center 102 and the cloud data center 104, and provide the earlier described data center management operations, such as adding remote cloud servers in cloud data center 104 to one or more server pools of cloud customer center 104 from remote server 502. However, DCM control module 115 would communicate with cloud management servers 120 of cloud data centers 104 via the aggregation service provider 506. That is, the aggregation service provider 506 would appear as a "cloud data center 104" to both cloud customer data center 102 and remote server 402. Aggregation service provider 506 would play the role of cloud management server 120 in FIG. 2 (abstracting for all cloud managements 120 of cloud data centers 104 being aggregated). In embodiments, aggregation service provider 506 would pre-query cloud management servers 120 of the cloud data centers 104 being aggregated for the available capacity and power management capability of cloud servers of the cloud data centers 104. Aggregation service provider 506 may aggregate the responsex, and save into a database it maintains. Accordingly, DCM control module 115 may query the database associated with aggregation service provider 506 for cloud server capacity and power management capability information. Similarly, DCM control module 115 may transmit power control commands to cloud servers 122 of cloud data centers 104, out-of-band, using the Redfish communication protocol.

Various embodiments may include at least one computer readable medium having a number of instructions stored therein and configured to enable a local server, in response to execution by one or more processors of the local server, to query a remote computing service having one or more remote servers and receive a record from the remote computing service in response to the query. The record may include information related to power management services available from the one or more remote servers. The instructions may enable the one or more processors to transmit power management commands, based on the information, to the remote computing service to at least partially control power consumption by the one or more remote servers. The information related to the record may include handle identifiers of the power management services or application programming interface (API) calls for the power management services.

According to embodiments, the instructions may be further configured to enable the local server, in response to execution by the one or more processors of the local server, to transmit the power management commands, using the API calls for the power management services and the handle identifiers, to reduce central processing unit (CPU) power consumption of the one or more remote servers.

According to embodiments, the instructions may be further configured to enable the local server, in response to execution by the one or more processors of the local server, to transmit the power management commands, using the API calls for the power management services, to the remote computing service to receive power consumption data of the one or more remote servers. The power consumption data may indicate a quantity of power consumed by each of the one or more remote servers.

According to embodiments, the instructions may be further configured to enable the local server, in response to execution by the one or more processors of the local server, to transmit the power management commands to the remote computing service to cause selected ones of the one or more remote servers to enter into at least one of a low-power mode or a power-down mode, based on the power consumption data of the one or more remote servers. The power consumption data may include power supply data, memory data, and processor data.

According to embodiments, the instructions may be further configured to enable the local server, in response to execution by the one or more processors of the local server, to determine from the record which ones of the one or more remote servers are enabled to be remotely power managed; and configure the remote power manage enabled ones of the one or more remote servers to a subnet shared by the local server to enable power management of the remote power manage enabled ones of the one or more remote servers by the local server.

The instructions may be further configured to enable the local server, in response to execution by the one or more processors of the local server, to authenticate at least part of the information included in the record.

According to various embodiments, a method may include querying a remote computing service, by a customer server, having one or more remote servers. The method may include receiving a record, by the customer server, from the remote computing service in response to the query. The record may include information related to power management services available from the one or more remote servers. The method may include transmitting power management commands, based on the information, to the remote computing service to at least partially control power consumption by the one or more remote servers.

According to various embodiments, a method may include receiving a request, by a remote computing management server from a customer server, for a record of power management services available by a number of remote computing servers that are networked to provide remote computing services and that are managed by the remote computing management server. The method may include determining, by the remote computing management server, ones of the number of remote computing servers that provide the power management services and creating, by the remote computing management server, the record of the power management services based on said determining. The method may include transmitting the record of the power management services to the customer server, in response the request for the record, to enable the customer server to access the power management services provided by the ones of the number of remote computing servers. The record may include interne protocol (IP) addresses of power management controllers of each of the ones of the one or more remote computing servers that provide the power management services. The record may include power management service application programming interface (API) calls to enable manipulation of the power management controllers.

According to embodiments, the method may also include receiving, by the remote computing management server, instructions from the customer server to transmit data related to power consumed by each of the ones of the one or more remote computing servers that provide the power management services; and transmitting, to the customer server, the data related to the power consumed by each of the one or more remote computing servers.

According to embodiments, the method may further include, in response to instructions from the customer server, transferring tasks from first partially loaded ones of the one or more remote computing servers that provide the power management services to second partially loaded ones of the one or more remote computing servers that provide power management service; and causing the first partially loaded ones of the one or more remote computing servers to power-down or to enter a low-power mode.

According to embodiments, the method may further include receiving, by the one or more remote computing servers, one or more programs from the customer server; installing the one or more programs onto the one or more remote computing servers; and enabling control of the one or more remote computing servers by the customer server through the one or more programs.

According to embodiments, the method may further include generating a message authentication code from the record; and transmitting the message authentication code with the record to the remote server, in response to the request, to enable the remote server to verify the authenticity of the record.

According to various embodiments, one or more computer readable media may include a number of instructions which, if executed by a processor of a customer server, may enable a customer server to operate according to the above described method.

According to various embodiments, a server may include a network interface configured to communicate with a remote computing service through a remote computing management server; memory coupled to the network interface and configured to store a number of instructions; and a processor coupled to the memory and the network interface. The processor may be configured to execute the number of instructions to send a request, via the network interface to the remote computing management server, to receive a record of remote computing servers that are managed by the remote computing management server to provide remote computing service for the server and that include power management controllers. The record may include handles that identify respective ones of the power management controllers. The processor may be further configured to execute the number of instructions to monitor power consumption of the remote computing servers and to selectively cause some of the remote computing servers, by using the handles, to enter a low-power mode based on the monitored power consumption. The processor may be configured to execute the number of instructions to authenticate that the record is unchanged upon receipt by the server.

According to various embodiments, a remote computing server may include a power supply; memory coupled to the power supply to receive power and to store a number of instructions; and one or more processors coupled to the power supply to receive power and coupled to the memory to execute the number of instructions stored by the memory. The remote computing server may include a number of power consumption meters configured to measure power consumption of the power supply the memory, and the one or more processors. The remote computing server may include a power management controller configured to collect data corresponding to the measured power consumption and configured to reduce the power consumption of the one or more processors in response to instructions received by a customer server subscribed to receive remote computing services from the remote computing server. The instructions may be based on power management application programming interface (API) calls made with a handle for the remote computing server. The handle may be managed by a remote computing management server. The remote computing server may include a network interface configured to transfer data between the processor, the power management controller, and a network. The power management controller may be configured to be responsive to the instructions while the remote computing server is powered down or in a low-power mode. The power management controller may be configured to provide a list of power management services available by the remote computing server in response to a power management service query from the remote computing management server to enable the remote computing management server to create a record that includes the list of power management services.

According to various embodiments, a remote computing management server may include a network interface configured to communicatively couple the remote computing management server to one or more remote computing servers; and memory configured to store a number of instructions for transferring information to and from the one or more remote computing servers. The remote computing management server may include one or more processors configured to execute the number of instructions to support or provide remote computing services. The one or more processors may be configured to execute the number of instructions to create a record that includes power management services provided by the one or more remote computing servers, in response to a query from a customer server that receives the remote computing services. The one or more processors may be configured to create the record to include one or more network identifiers of the one or more remote computing servers that provide power management services. The one or more processors may be configured to execute the number of instructions to generate a security code based on the record and to transmit the security code with the record to the customer server to enable the customer server to authenticate the record.

According to various embodiments, at least one computer readable medium may have a number of instructions stored therein and configured to enable a remote computing server, in response to execution by one or more processors of the remote computing server, to provide remote computing services to one or more customer servers and to determine whether the remote computing server is configured to provide remote power management services. The number of instructions may enable the remote computer server to reply to a query from a managing server that is configured manage the remote computer server and other remote computing server. Replying to the query may include indicating which, if any, power management services the remote computing server is configured to provide. The number of instructions may enable the remote computer server to, in response to power management commands received from at least one of the one or more customer servers, decrease power consumption by the remote computing server.

In embodiments, the instructions may be further configured to enable the one or more processors of the remote computing server to monitor a power consumption of a power supply of the remote computer server, monitor a power consumption of the one or more processors, and transmit the power consumption of the power supply and the power consumption of the one or more processors to the at least one of the one or more customer servers. In embodiments, decreasing power consumption may include causing the remote computing server to enter a shut down sequence.

According to various embodiments, a method may include providing remote computing services to one or more customer servers; and determining whether the remote computing server is configured to provide remote power management services. The method may include replying to a query from a managing server that is configured manage the remote computer server and other remote computing server, wherein replying to the query includes indicating which, if any, power management services the remote computing server is configured to provide; and, in response to power management commands received from at least one of the one or more customer servers, decrease power consumption by the remote computing server.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims.

Additional example embodiments disclosed may also include Example 1 may be an apparatus to control power consumption of computer hardware, comprising: one or more processors; and a datacenter management control module, to be operated on the one or more processors, to: receive a request to increase capacity of a server pool having one or more computer servers from a computing device associated with the server pool; determine an available server with available capacity to meet or contribute to meeting the requested capacity, and includes a power management controller to collect power consumption data for one or more of a power supply, a memory, or a processor of the available server, wherein the available server may be a remote cloud server in a different subnet than the computer servers of the server pool and the computing device; add or facilitate addition of the available server to the server pool; and transmit power management commands to the server added to the server pool to at least partially control power consumption of the server provided with the power management commands.

Example 2 may be example 1, where the apparatus may be in the same subnet as the computer servers of the server pool and the computing device. Example 3 may be example 1, where the apparatus may be in a different subnet as the computer servers of the server pool and the computing device. Example 4 may be example 3, wherein the datacenter management control module may transmit the power management commands to the server added to the server pool via an out-of-band communication channel. Example 5 may be example 3, wherein the datacenter management control module may transmit the power management commands to the server added to the server pool using a protocol that conforms to one or more representational state transfer constraints.

Example 6 may be example 3, wherein the datacenter management control module may: send a query for available servers and their power management capability to a database; and receive service metadata associated with the available server in response to the query. Example 7 may be example 6, wherein the database may be associated with a cloud management server of a cloud data center, and the available server may be associated with the cloud data center. Example 8 may be example 6, wherein the database may be associated with an aggregator service that aggregate cloud computing services provided by a plurality of cloud data centers; and wherein the available server may be associated with one of a plurality cloud data centers. Example 9 may be any one of examples 3-8, wherein the datacenter management control module may also transmit power management commands to one or more computer servers of the server pool to at least partially control power consumption of the one or more computer servers of the server pool. Example 10 may be example 9, wherein the datacenter management control module may transmit the power management commands to the one or more computer servers of the server pool using an intelligent platform management interface.

Example 11 may be a method for controlling power consumption of computer hardware, comprising: receiving, by a datacenter infrastructure management controller, a request to increase capacity of a server pool having one or more computer servers from a computing device associated with the server pool; determining, by the datacenter infrastructure management controller, an available server with available capacity to meet or contribute to meeting the requested capacity, and includes a power management controller to collect power consumption data for one or more of a power supply, a memory, or a processor of the available server, wherein the available server may be a remote cloud server in a different subnet than the computing device; adding or facilitating adding, by the datacenter infrastructure management controller, the available server to the server pool; and transmitting, by the datacenter infrastructure management controller, power management commands to the server added to the server pool to at least partially control power consumption of the server provided with the power management commands.

Example 12 may be example 11, where the datacenter infrastructure management controller may be disposed on a computing apparatus that may be in the same subnet as the computer servers of the server pool and the computing device. Example 13 may be example 11, where the datacenter infrastructure management controller may be disposed on a computing apparatus that may be in a different subnet as the computer servers of the server pool and the computing device. Example 14 may be example 13, wherein the power management commands are sent to the server added to the server pool via an out-of-band communication channel. Example 15 may be example 13, wherein the power management commands are sent to the server added to the server pool using a protocol that conforms to one or more representational state transfer constraints.

Example 16 may be example 13, wherein determining an available server includes: sending, by the datacenter infrastructure management controller, a query for available servers and their power management capability to a database; and receiving, by the datacenter infrastructure management controller, service metadata associated with the available server. Example 17 may be example 16, wherein the database may be associated with a cloud management server of the cloud data center; and wherein the available server may be associated with the cloud data center. Example 18 may be example 16, wherein the database may be associated with an aggregator service that aggregate cloud computing services provided by a plurality of cloud data centers; and wherein the available server may be associated with one of the plurality cloud data centers. Example 19 may be any one of examples 13-18, further comprising transmitting, by the datacenter infrastructure management controller, power management commands to one or more computer servers of the server pool to at least partially control power consumption of the one or more computer servers of the server pool. Example 20 may be example 19, wherein the datacenter management control module may transmit the power management commands to the one or more computer servers of the server pool using an intelligent platform management interface.

Example 21 may be at least one computer-readable medium having a plurality of instructions stored therein, and configured to enable a computing apparatus, in response to execution by one or more processors of the computing apparatus, to: receive a request to increase capacity of a server pool having one or more computer servers from a computing device associated with the server pool; determine an available server with available capacity to contribute to the requested capacity, and includes a power management controller to collect power consumption data for one or more of a power supply, a memory, or a processor of the available server, wherein the available server may be a remote cloud server in a different subnet than the computer servers of the server pool and the computing device; add or facilitate addition of the available server to the server pool; and transmit power management commands to the server added to the server pool to at least partially control power consumption of the server.

Example 22 may be example 21, where the computing apparatus may be in the same subnet as the computer servers of the server pool and the computing device. Example 23 may be example 21, where the computing apparatus may be in a different subnet as the computer servers of the server pool and the computing device. Example 24 may be example 23, wherein the instructions are to cause the computing apparatus to transmit the power management commands via an out-of-band communication channel. Example 25 may be example 23, wherein the instructions are to cause the computing apparatus to transmit the power management commands using a protocol that conforms to one or more representational state transfer constraints.

Example 26 may be example 23, wherein the instructions are also to cause the computing apparatus to: send a query for available servers and their power management capability to a database; and receive service metadata associated with the available server in response to the query. Example 27 may be example 26, wherein the database may be associated with a cloud management server of a cloud data center; and wherein the available server may be associated with a cloud data center. Example 28 may be example 26, wherein the database may be associated with an aggregator service that aggregate cloud computing services provided by a plurality of cloud data centers; and wherein the available server may be associated with one of a plurality cloud data centers. Example 29 may be any one of the examples 23-28, wherein the instructions are also to cause the computing apparatus to transmit power management commands to one or more computer servers of the server pool to at least partially control power consumption of the one or more computer servers of the server pool. Example 30 may be example 29, wherein the instructions are also to cause the computing apparatus to transmit the power management commands to the one or more servers of the server pool using an intelligent platform management interface.

Example 31 may be an apparatus for controlling power consumption of computer hardware, comprising: means for receiving a request to increase capacity of a server pool having one or more computer servers from a computing device associated with the server pool; means for determining an available server with available capacity to contribute to the requested capacity, and includes a power management controller to collect power consumption data for one or more of a power supply, a memory, or a processor of the available server, wherein the available server may be a remote cloud server in a different subnet than the computing device; means for adding or facilitating adding the available server to the server pool; and means for transmitting power management commands to the server added to the server pool to at least partially control power consumption of the server provided with the power management commands.

Example 32 may be example 31, where the apparatus may be in the same subnet as the computer servers of the server pool and the computing device. Example 33 may be example 31, where the apparatus may be in a different subnet as the computer servers of the server pool and the computing device. Example 34 may be example 33, wherein the power management commands are sent to the server added to the server pool via an out-of-band communication channel. Example 35 may be example 33, wherein the power management commands are sent to the server added to the server pool using a protocol that conforms to one or more representational state transfer constraints.

Example 36 may be example 35, wherein means for determining an available server includes: means for sending a query for available servers and their power management capability to a database; and means for receiving service metadata associated with the available server. Example 37 may be example 36, wherein the database may be associated with a cloud management server of a cloud data center, and the available server may be associated with the cloud data center. Example 38 may be example 36, wherein the database may be associated with an aggregator service that aggregate cloud computing services provided by a plurality of cloud data centers; and wherein the available server may be associated with one of a plurality cloud data centers. Example 39 may be any one of the examples 33-38, further comprising means for transmitting power management commands to one or more servers of the server pool to at least partially control power consumption of the one or more servers of the server pool. Example 40 may be example 39, wherein the means for transmitting power management commands may be further for transmitting the power management commands to the one or more servers of the server pool using an intelligent platform management interface.

What is claimed is:

1. An apparatus to control power consumption of computer hardware of computer servers, the apparatus comprising:
   one or more processors; and
   a datacenter management control module, to be operated on the one or more processors, to:
      receive a request to increase capacity of a server pool having one or more first servers of the computer servers, the request from a computing device associated with the server pool;
      determine, based on encrypted data of at least one record obtained from the computer servers, an available second server of the computer servers with available capacity to meet or contribute to meeting the requested capacity, wherein the available second server includes a power management controller to collect power consumption data for one or more of a power supply, a memory, or a processor of the available second server, wherein the available second server is a remote cloud server in a different subnet than a subnet of the one or more first servers of the server pool and the computing device;
      add or facilitate addition of the available second server to the server pool; and
      transmit power management commands to the second server added to the server pool to at least partially control power consumption of the second server provided with the power management commands.

2. The apparatus of claim 1, wherein the subnet of the one or more first servers of the server pool and the computing device comprises a first subnet and the different subnet comprises a second subnet, where the one or more processors are in the first subnet.

3. The apparatus of claim 1, wherein the subnet of the one or more first servers of the server pool and the computing device comprises a first subnet and the different subnet comprises a second subnet, where the one or more processors are in the second subnet.

4. The apparatus of claim 3, wherein the datacenter management control module is to transmit the power management commands to the second server via an out-of-band communication channel.

5. The apparatus of claim 3, wherein the datacenter management control module is to transmit the power management commands to the second server added to the server pool using a protocol that conforms to one or more representational state transfer constraints.

6. The apparatus of claim 3, wherein the datacenter management control module is to:
send a query for available servers and their power management capability to a database; and
receive service metadata associated with the available server in response to the query.

7. The apparatus of claim 6, further comprising the datacenter management control module of a cloud management server of a cloud data center, wherein the cloud management server comprises a first cloud data center server of the cloud data center and the second server comprises a second different cloud data center server of the cloud data center, wherein the database is accessible by the first could data center server of the cloud data center.

8. The apparatus of claim 7, wherein the cloud data center comprises a cloud data center of a plurality of cloud data centers, and wherein the database is associated with an aggregator service that aggregates cloud computing services provided by the plurality of cloud data centers.

9. The apparatus of claim 3, wherein the datacenter management control module is further to transmit power management commands to the one or more first servers and the second server of the server pool to at least partially control power consumption of the one or more first servers and the second server of the server pool.

10. The apparatus of claim 9, wherein the datacenter management control module is to transmit the power management commands to the one or more first servers and the second server of the server pool using an intelligent platform management interface.

11. A method for controlling power consumption of computer hardware of computer servers, the method comprising:
receiving, by a datacenter infrastructure management controller, a request to increase capacity of a server pool having one or more first servers of the computer servers, the request from a computing device associated with the server pool;
determining, by the datacenter infrastructure management controller and based on encrypted data of at least one record obtained from the computer servers, an available second server of the computer servers with available capacity to meet or contribute to meeting the requested capacity, wherein the available server includes a power management controller to collect power consumption data for one or more of a power supply, a memory, or a processor of the available second server, wherein the available second server is a remote cloud server in a different subnet than a subnet of the computing device;
adding or facilitating adding, by the datacenter infrastructure management controller, the available second server to the server pool; and
transmitting, by the datacenter infrastructure management controller, power management commands to the second server added to the server pool to at least partially control power consumption of the second server provided with the power management commands.

12. The method of claim 11, wherein the subnet of the computing device comprises a first subnet, where the datacenter infrastructure management controller operates in the second subnet.

13. The method of claim 12, wherein the power management commands are sent to the second server added to the server pool via an out-of-band communication channel; and wherein the power management commands are sent to the second server added to the server pool using a protocol that conforms to one or more representational state transfer constraints.

14. The method of claim 12, wherein determining an available second server includes:
sending, by the datacenter infrastructure management controller, a query for available servers and their power management capability to a database; and
receiving, by the datacenter infrastructure management controller, service metadata associated with the available second server.

15. The method of claim 14, wherein the database is associated with an aggregator service that aggregates cloud computing services provided by a plurality of cloud data centers, and wherein the available second server is associated with a cloud data center of the plurality cloud data centers.

16. The method of claim 12, further comprising transmitting, by the datacenter infrastructure management controller, power management commands to the one or more first servers and the second server of the server pool to at least partially control power consumption of the one or more first servers and the second server of the server pool; wherein the datacenter management control module is to transmit the power management commands to the one or more first servers and the second server of the server pool using an intelligent platform management interface.

17. At least one non-transitory computer-readable medium having a plurality of instructions stored therein, and configured to enable a computing apparatus, in response to execution by one or more processors of the computing apparatus, to:
receive a request to increase capacity of a server pool having one or more first servers of computer servers, the request from a computing device associated with the server pool;
determine, based on encrypted data of at least one record obtained from the computer servers, an available second server of the computer servers with available capacity to contribute to the requested capacity, wherein the available second server includes a power management controller to collect power consumption data for one or more of a power supply, a memory, or a processor of the available second server, wherein the available second server is a remote cloud server in a different subnet than a subnet of the one or more first servers of the server pool and the computing device;
add or facilitate addition of the available second server to the server pool; and
transmit power management commands to the second server added to the server pool to at least partially control power consumption of the second server.

18. The at least one non-transitory computer-readable medium of claim 17, wherein the subnet of the one or more first servers of the server pool and the computing device comprises a first subnet and the different subnet comprises a second subnet, where the one or more processors are in a third subnet that is different than the second subnet.

19. The at least one non-transitory computer-readable medium of claim 17, wherein the instructions are to cause the computing apparatus to transmit the power management commands via an out-of-band communication channel.

20. The at least one non-transitory computer-readable medium of claim 17, wherein the instructions are to cause the computing apparatus to transmit the power management commands using a protocol that conforms to one or more representational state transfer constraints.

21. The at least one non-transitory computer-readable medium of claim 17, wherein the instructions are also to cause the computing apparatus to:
send a query for available servers and their power management capability to a database; and
receive service metadata associated with the available second server in response to the query.

22. The at least one non-transitory computer-readable medium of claim 21, wherein the database is associated with a cloud management server of a cloud data center; and wherein the available second server is associated with the cloud data center.

23. The at least one non-transitory computer-readable medium of claim 21, wherein the cloud data center is a cloud data center of a plurality of cloud data centers, and wherein the database is associated with an aggregator service that aggregate cloud computing services provided by the plurality of cloud data centers; and wherein the available second server is associated with the cloud data center of the plurality of cloud data centers.

24. The at least one non-transitory computer-readable medium of claim 17, wherein the instructions are further to cause the computing apparatus to transmit power management commands to the one or more first servers and the second server of the server pool to at least partially control power consumption of the one or more first servers and the second server of the server pool.

25. The at least one non-transitory computer-readable medium of claim 24, wherein the instructions are also to cause the computing apparatus to transmit the power management commands to the one or more first servers and the second server of the server pool using an intelligent platform management interface.

* * * * *